United States Patent
Suzuki et al.

(10) Patent No.: US 9,212,895 B2
(45) Date of Patent: Dec. 15, 2015

(54) FLEXIBLE STRAINED SENSOR WITH PROTECTIVE COATING

(71) Applicants: Yamaha Corporation, Hamamatsu-Shi, Shizuoka-ken (JP); NATIONAL UNIVERSITY CORPORATION SHIZUOKA UNIVERSITY, Shizuoka-Shi, Shizuoka-ken (JP)

(72) Inventors: Katsunori Suzuki, Hamamatsu (JP); Shingo Sakakibara, Hamamatsu (JP); Koji Yataka, Hamamatsu (JP); Yasuro Okumiya, Hamamatsu (JP); Yoshiki Terada, Hamamatsu (JP); Yoku Inoue, Hamamatsu (JP)

(73) Assignees: YAMAHA CORPORATION, Hamamatsu (JP); NATIONAL UNIVERSITY CORPORATION SHIZUOKA UNIVERSITY, Suruga (JP)

( * ) Notice: Subject to any disclaimer, the term of this patent is extended or adjusted under 35 U.S.C. 154(b) by 0 days.

(21) Appl. No.: 13/673,186

(22) Filed: Nov. 9, 2012

(65) Prior Publication Data

US 2013/0118267 A1 May 16, 2013

(30) Foreign Application Priority Data

Nov. 14, 2011 (JP) ................................. 2011-249172

(51) Int. Cl.
*G01B 7/16* (2006.01)

(52) U.S. Cl.
CPC ....................... *G01B 7/18* (2013.01)

(58) Field of Classification Search
CPC .............. G01B 7/16; G01B 7/18; G01B 7/28; B82Y 5/00; B82Y 35/00; B82Y 10/00; C09D 1/00; C09D 189/00; H01L 2924/0665; H01L 2924/06; C08J 7/045; C08J 2367/02; C08J 2427/12; H01B 1/24
USPC .............................. 73/774, 763, 767; 977/742
See application file for complete search history.

(56) References Cited

U.S. PATENT DOCUMENTS 7,523,670 B2 * 4/2009 Meyer et al. ..................... 73/776
2004/0031311 A1 * 2/2004 Meyer et al. ......................... 73/7

(Continued)

FOREIGN PATENT DOCUMENTS

CN 1962429 A 5/2007
CN 101121859 2/2008

(Continued)

OTHER PUBLICATIONS

English Machine Translation of WO-2011024539 "The Expansion Device Using Carbon Nanotube and Method for Manufacturing Same"—Yamada Takeo, Hata Kenji, Hayamizu Yuhei.*

(Continued)

*Primary Examiner* — Lisa Caputo
*Assistant Examiner* — Philip Cotey
(74) *Attorney, Agent, or Firm* — Dickstein Shapiro LLP (57) ABSTRACT

A strain sensor includes a flexible substrate, a CNT film made of a plurality of CNT fibers aligned in an orientation direction, a pair of electrodes, and a protective coat. The electrodes are formed at the opposite ends of the CNT film in a perpendicular direction to the orientation direction of the CNT fibers. The protective coat protecting the CNT film is made of a resin, a water-based emulsion, or an oil-based emulsion. The protective coat is placed in contact with at least part of the CTN fibers on the surface of the CNT film. The strain sensor including the protective coat is able to prevent damage/breakage of the CNT film and to prevent foreign matters from entering into gaps between CNT fibers, thus improving durability in maintaining adequate sensing functionality.

12 Claims, 5 Drawing Sheets

(56) References Cited

U.S. PATENT DOCUMENTS

| | | | |
|---|---|---|---|
| 2005/0069796 A1* | 3/2005 | Iwasaki et al. | 430/73 |
| 2005/0086794 A1* | 4/2005 | Fukunaka et al. | 29/603.01 |
| 2005/0209392 A1* | 9/2005 | Luo et al. | 524/496 |
| 2006/0025511 A1* | 2/2006 | Silvers et al. | 524/445 |
| 2006/0113510 A1* | 6/2006 | Luo et al. | 252/500 |
| 2006/0123918 A1* | 6/2006 | Ogisu et al. | 73/774 |
| 2006/0253942 A1* | 11/2006 | Barrera et al. | 977/852 |
| 2006/0278945 A1* | 12/2006 | Sakurai | 257/433 |
| 2007/0012111 A1* | 1/2007 | Kim | 73/594 |
| 2007/0261493 A1* | 11/2007 | Kim | 73/594 |
| 2008/0011086 A1* | 1/2008 | Kim | 73/632 |
| 2008/0170982 A1* | 7/2008 | Zhang et al. | 423/447.3 |
| 2008/0186563 A1* | 8/2008 | Chen | 359/322 |
| 2008/0249207 A1* | 10/2008 | Whiteley et al. | 523/122 |
| 2009/0007685 A1* | 1/2009 | Cheng et al. | 73/774 |
| 2009/0186959 A1* | 7/2009 | Kim | 522/84 |
| 2009/0226833 A1* | 9/2009 | Sato et al. | 430/105 |
| 2009/0258241 A1* | 10/2009 | Shiraishi et al. | 428/457 |
| 2009/0269560 A1* | 10/2009 | Dhinojwala et al. | 977/742 |
| 2009/0302411 A1* | 12/2009 | Massetti | 257/447 |
| 2010/0085067 A1* | 4/2010 | Gabriel et al. | 324/663 |
| 2010/0104967 A1* | 4/2010 | Ikeda et al. | 430/108.23 |
| 2010/0132476 A1* | 6/2010 | Cheng et al. | 73/774 |
| 2010/0144205 A1* | 6/2010 | Searfass | 977/932 |
| 2010/0248100 A1* | 9/2010 | Ezumi | 430/56 |
| 2010/0315790 A1* | 12/2010 | Imaoka et al. | 361/748 |
| 2011/0049579 A1* | 3/2011 | Dumitru et al. | 257/254 |
| 2011/0050040 A1* | 3/2011 | Yamamoto et al. | 310/338 |
| 2011/0050041 A1* | 3/2011 | Yamamoto et al. | 310/338 |
| 2011/0081724 A1* | 4/2011 | Swager et al. | 436/57 |
| 2011/0147715 A1* | 6/2011 | Rogers et al. | 257/24 |
| 2011/0217451 A1* | 9/2011 | Veerasamy | 427/58 |
| 2011/0304579 A1* | 12/2011 | Feng et al. | 345/174 |
| 2011/0304991 A1* | 12/2011 | Huang et al. | 361/719 |

FOREIGN PATENT DOCUMENTS

| | | |
|---|---|---|
| CN | 101570662 A | 11/2009 |
| CN | 102095362 A | 6/2011 |
| JP | 62-200701 | 9/1987 |
| JP | 2003-227808 A | 8/2003 |
| JP | 2005-070038 A | 3/2005 |
| JP | 2005-223107 | 8/2005 |
| JP | 2009-189747 | 8/2009 |
| JP | 2010-47702 | 3/2010 |
| JP | 2010-281824 A | 12/2010 |
| JP | 2011-047702 A | 3/2011 |
| WO | WO-2004-065926 A1 | 8/2004 |
| WO | WO 2011024539 * | 3/2011 |

OTHER PUBLICATIONS

Shimizu, Sayaka et al.; "Growth and Application of Ultra-Long Multi-Walled Carbon Nanotube"; Journal of Automation, Mobile Robotics & Intelligent Systems, vol. 3, No. 4, 2009, pp. 163-165.

Ghemes, Crina et al.; "Synthesis of Long and Spinnable Multi-Walled Carbon Nanotubes"; Journal of Advanced Research in Physics 3(1), 011209 (2012), 3 pages.

Inoue, Yoku et al.; "Anisotropic carbon nanotube papers fabricated from multiwalled carbon nanotube webs"; Carbon 49 (2011), pp. 2437-2443.

Kang, I., et al.; "A carbon nanotube strain sensor for structural health monitoring"; Smart Materials and Structures, IOP Publishing Ltd., Bristol, GB, vol. 15, No. 3, Jun. 1, 2006, pp. 737-748.

European Search Report issued for EP Application No. 14 16 7525.6, mailing date Sep. 22, 2014.

Hidenori Mimura, Tsubasa Inoue, Fast Growth of Carbon Nanotube and Fibrilization Thereof (Keynote Lecture), Information-Intelligence-Precision Equipment Division Lecture Meeting Proceedings, Mar. 16, 2010, pp. 1 to 5.

Japanese Office Action mailed Sep. 8, 2015 issued in corresponding Japanese Application No. 2011-249172.

* cited by examiner

FLEXIBLE STRAINED SENSOR WITH PROTECTIVE COATING

BACKGROUND OF THE INVENTION

1. Field of the Invention

The present invention relates to a strain sensor detecting displacement, impact, stress, strain, deformation, and/or distortion on materials, objects, matters, and/or substances, and in particular to a strain sensor using carbon nanotubes.

The present application claims priority on Japanese Patent Application No. 2011-249172, the entire content of which is incorporated herein by reference.

2. Description of the Related Art

Conventionally, strain sensors are designed to detect strain based on resistance variations, e.g. resistances of resistors which are varied due to strain (e.g. expansion and contraction) applied thereto. Generally, metals or semiconductors have been used for resistors. However, metals or semiconductors have limitations when applied to strain sensors because they may produce a small amount of strain due to reversible expansion and contraction.

Considering this drawback, various devices using carbon nanotubes (CNTs) as resistors have been developed and disclosed in various documents such as Patent Literatures 1 to 4. Patent Literatures 1-3, which were written by the same applicant but filed in different ways, are each directed to smart materials; strain sensing and stress determination by means of nanotube sensing systems, composites, and devices using carbon nanotubes that are capable of detecting displacement, impact, stress, and/or strain in materials. Patent Literature 4 discloses an expansion/contraction device using carbon nanotubes. Additionally, Non-Patent Literature 1 is an article entitled "Growth and Application of Ultra-Long Multi-Walled Carbon Nanotube", which focuses on an easy and efficient synthesis method of vertically-aligned ultra-long multi-walled nanotubes using iron chloride powder.

The foregoing devices uses CNT films made of a plurality of CNTs oriented in a predetermined direction. It is believed that CNT films are applicable to sensors detecting a high strain because CNT films can be largely expanded or contracted in a perpendicular direction to the orientation direction of CNTs. However, the foregoing devices are produced using CNT films which are exposed on their surfaces. This may cause abnormality in resistance variations of CNTs (serving as resistors), for example, when CNT films are unexpectedly damaged or broken due to abrupt contact with materials, when foreign matters unexpectedly enter into gaps formed between CNTs, and/or when moisture or floating gas is applied to CNTs. This may degrade durability (or machine life) in sensing functionality.

CITATION LIST

Patent Literature

Patent Literature 1: Japanese Patent Application Publication No. 2010-281824
Patent Literature 2: International Publication No. WO 2004/065926 A1
Patent Literature 3: U.S. Patent Application Publication No. US 2006/0253942 A1
Patent Literature 4: Japanese Patent Application Publication No. 2011-47702

Non Patent Literature

Non-Patent Literature 1: An article entitled "GROWTH AND APPLICATION OF ULTRA-LONG MULTI-WALLED CARBON NANOTUBE", written for Journal of Automation, Mobile Robotics & Intelligent Systems, Volume 3, No. 4, 2009

SUMMARY OF THE INVENTION

It is an object of the present invention to provide a strain sensor which is able to prevent the occurrence of damage/breakage of CNT films and/or inclusion of foreign matters into CNTs, and which is able to improve durability in sensing functionality.

The present invention is directed to a strain sensor including a flexible substrate; a CNT film which is made of a plurality of CNT fibers aligned in an orientation direction; a pair of electrodes which are formed at the opposite ends of the CNT film in a perpendicular direction to the orientation direction of the CNT fibers; and a protective coat, made of a resin (particles), a water-based emulsion, or an oil-based emulsion, protecting the CNT film. The protective coat is placed in contact with at least part of the CTN fibers on the surface of the CNT film.

The strain sensor including the protective coat is able to prevent damage/breakage of the CNT film, thus improving durability in maintaining adequate sensing functionality.

It is preferable that the protective coat be laminated on the surface of the CNT film, which may improve the protecting function of the protective coat. This may contribute to the outstanding effects regarding the protective coat, for example, wherein it is possible to prevent damage/breakage of the CNT film, to prevent foreign matters from entering into gaps between CNT fibers, and to prevent moisture or floating gas from being adhered to CNT fibers.

It is preferable that the protective coat be made of a water-based emulsion, which makes it possible to form the protective coat by way of coating or dipping. Additionally, it is possible to preserve the protective coat laminated on the surface of the CNT film without resin particles partially impregnated into the CNT film. In other words, it is possible to prevent unwanted resistance variation of the CNT film which may occur when resin particles are partially impregnated into the CNT film.

It is preferable that the protective coat be partially permeated into at least part of gaps between CNT fibers. This may also contribute to the outstanding effects regarding the protective coat. In this connection, the protective coat may partially include CNT fibers therein. In other words, the protective coat is partially interposed into gaps between CNT fibers. This prevents the CNT film from being excessively reduced in thickness when the CNT film is stretched due to strain applied to the strain sensor. Additionally, it is possible to prevent a reduction of resistance when a plurality of CNT fibers approaches to each other in the thickness direction of the CNT film.

It is preferable that the protective coat include a plurality of conductive additives, which may allow the protective coat to be partially interposed into gaps between CNT fibers, thus suppressing an increase of resistance in the CNT film.

It is preferable that the CNT film include at least one cleavable part in the orientation direction of CNT fibers, which may improve transient response to resistance variation occurring in the CNT film. Thus, the strain sensor is able to demonstrate a superior sensing function against a relatively high strain (e.g. a large expansion/contraction).

It is preferable that CNT fibers are each made of a plurality of CNT monofilaments, which are elongated in the longitudinal direction and partially coupled together via couplers. This makes it possible to form the CNT film with a large width in the orientation direction of CNT fibers. Thus, it is possible to reduce resistance of the CNT film and to reduce resistance variation on the CNT film.

It is preferable that a plurality of CNT monofilaments be coupled together in a network structure. This may achieve high densification of CNT fibers, thus reducing resistance of the CNT film. In the network structure, adjacent CNT monofilaments are coupled together about couplers serving as cardinal points, and therefore CNT fibers may collectively function as a both-sided beam structure, which in turn increases spring constants of CNT fibers. That is, the strain sensor with the CNT film, which is made of a plurality of CNT fibers each connecting a plurality of CNT monofilaments in the network structure, is able to exhibit a high rigidity in the perpendicular direction to the orientation direction of CNT fibers. This may improve the functionality of the strain sensor with linearity in strain sensing.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENTS

The present invention will be described in further detail by way of examples with reference to the accompanying drawings.

1. First Embodiment

Figure 1A:
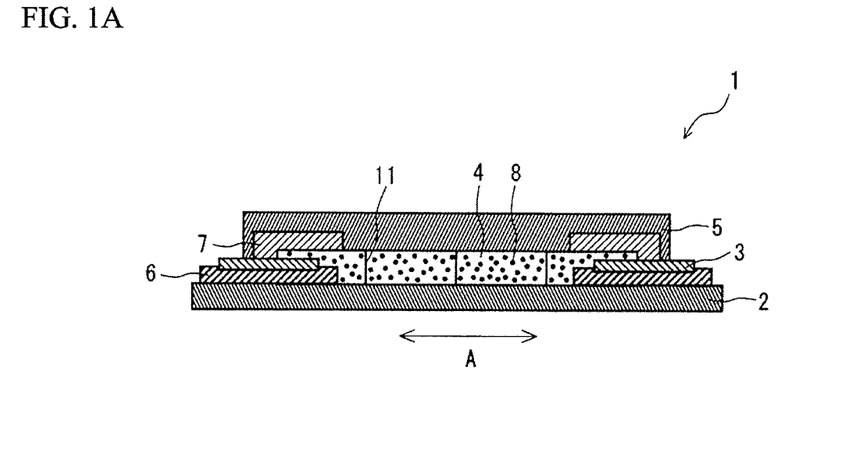
FIG. 1A is a cross-sectional view of a strain sensor according to a first embodiment of the present invention.
Figure 1B:
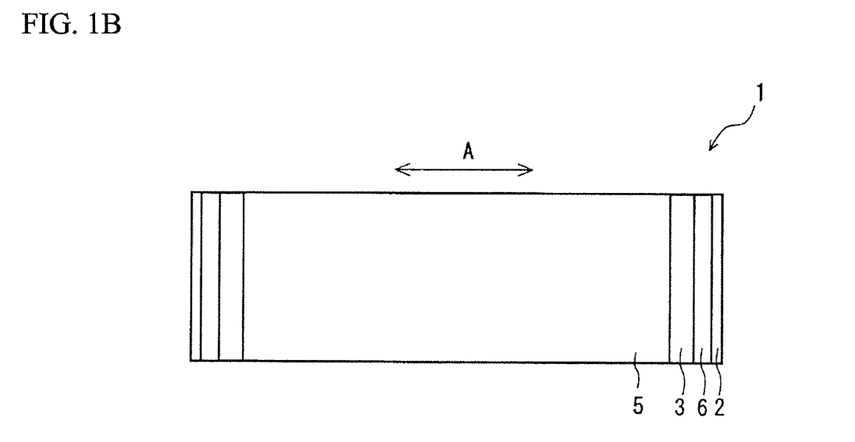
FIG. 1B is a plan view of the strain sensor.

A strain sensor 1 according to a first embodiment of the present invention will be described with reference to FIGS. 1A and 1B. FIG. 1A is a cross-sectional view of the strain sensor 1, while FIG. 1B is a plan view of the strain sensor 1. The strain sensor 1 includes a substrate 2, a CNT film 4, a pair of electrodes 3, and a protective coat 5. The CNT film 4 made of a plurality of CNT fibers 8 oriented in one direction are formed on the surface of the substrate 2. The electrodes 3 are formed on opposite ends of the substrate 2 lying in a direction A which differs from the orientation direction of the CNT fibers 8. The protective coat 5 is formed to protect the CNT film 4.

The substrate 2 is a plate-like substance having flexibility. The substrate 2 is not necessarily limited in size and dimensions. For example, the thickness of the substrate 2 may range from 10 μm to 5 mm; the width thereof may range from 1 mm to 5 cm; and the length thereof may range from 1 cm to 20 cm.

The substrate 2 is not necessarily limited in material as long as it has flexibility. As the material for the substrate 2, it is possible to employ a synthetic resin, a type of rubber, an unwoven cloth, a metal with deformability or deformable property, or a metallic compound. It is possible to produce the substrate 2 by use of an insulating material or a high-resistive material. When the substrate 2 is produced using a low-resistivity material such as a metal, it is necessary to coat the surface of the substrate 2 with an insulating layer or a high-resistive material. Among these materials, it is preferable to use a synthetic resin or rubber. It is optimal to use rubber. It is possible to improve the flexibility of the substrate 2 by using rubber.

As synthetic resins, for example, it is possible to name a phenol resin (PF), an epoxy resin (EP), a melanin resin (MF), a urea resin (UF), an unsaturated polyester resin (UP), an alkyd resin, a polyurethane (PUR), a thermosetting polyimide (PI), a polyethylene (PE), a high-density polyethylene (HDPE), a middle-density polyethylene (MDPE), a low-density polyethylene (LDPE), a polypropylene (PP), a polyvinyl chloride (PCV), a polyvinylidene chloride , a polystyrene (PS), a polyvinyl acetate (PVAc), an acrylonitrile-butadiene-styrene resin (ABS), an acrylonitrile-styrene resin (AS), a polymethyl methacryl resin (PMMA), a polyamide (PA), a polyacetal (POM), a polycarbonate (PC), a modified polyphenylene ether (m-PPE), a polybutylene terephthalate (PBT), and a polyethylene terephthalate (PET), a cyclic polyolefin (COP).

As rubbers, for example, it is possible to name a natural rubber (NR), a butyl rubber (IIR), an isoprene rubber (IR), an ethylene-propylene rubber (EPDM), a butadiene rubber (BR), an urethane rubber (U), a styrene-butadiene rubber (SBR), a silicone rubber (Q), a chloroprene rubber (CR), a chlorosulfonated polyethylene rubber (CSM), an acrylonitrile-butadiene rubber (NBR), a chlorinated polyethylene (CM), an acryl rubber (ACM), an epichlorohydrin rubber (CO, ECO), a fluororubber (FKM), and PDMS. Among these rubbers, it is preferable to use a natural rubber due to its strength.

A pair of electrodes 3 is formed on the surface of the substrate 2 at the opposite ends in the longitudinal direction A (i.e. a perpendicular direction to the orientation direction of the CNT fibers 8). Specifically, a pair of electrodes 3 is formed on a pair of first conductive layers 6, which are formed at the opposite ends distanced from each other in the longitudinal direction A on the surface of the substrate 2.

The first conductive layers 6 may improve electrical connectivity between the electrodes 3 and the CNT film 4. The first conductive layers 6 are not necessarily limited in material as long as it has conductivity. For example, it is possible to use conductive-rubber adhesives. When the first conductive layers 6 are made of conductive-rubber adhesives, it is possible to improve adherence between the substrate 2 and the electrodes 3 with the opposite ends of the CNT film 4, thus improving the durability of the strain sensor 1.

Each of the electrodes 3 has a band shape. The electrodes 3 are disposed in parallel in the width direction of the substrate 2. The electrodes 3 are not necessarily limited in material; for example, it is possible to use metals such as copper, silver, and aluminum.

The electrodes 3 are not necessarily limited in their shapes. For example, it is preferable employ a film shape, a plate-like shape, or a mesh-like shape. Among these shapes, it is preferable to employ a mesh-like shape. The mesh-shaped electrodes 3 may improve adhesion and joining property with the first conductive layers 6 as well as second conductive layers 7.

As the mesh-shaped electrodes 3, it is possible to employ metal meshes and metal-deposited/sputtered unwoven cloths. In this connection, it is possible to form the electrodes 3 by applying conductive adhesives onto the surface of the substrate 2.

The CNT film 4 has a rectangular shape in plan view. The electrodes 3 join the opposite ends of the CNT film 4 in the longitudinal direction A. Additionally, The CNT film 4 is fixed in position since the opposite ends thereof (which are separated from each other in the longitudinal direction A) are tightly held between the first conductive layers 6 and the second conductive layers 7.

Similar to the first conductive layers 6, the second conductive layers 7 may improve electrical connectivity between the electrodes 3 and the CNT film 4. The second conductive layers 7 are not necessarily limited in material as long as it has conductivity. For example, it is possible to use conductive-rubber adhesives for the second conductive layers 7. The second conductive layers 7 made of conductive-rubber adhesives may improve adherence of the electrodes 3 with the opposite ends of the CNT film 4, thus improving durability of the strain sensor 1.

The CNT film 4 is made of a plurality of CNT fibers 8 oriented in one direction (i.e. a direction different from the longitudinal direction A in which the electrodes 3 are distanced from each other). When the strain sensor 1 is strained such that the electrodes 3 are separating from each other in the direction A, the CNT fibers 8 are displaced so that contact areas among them will be changed due to the aforementioned orientation of the CNT fibers 8, thus causing resistance variation with the CNT film 4. Thus, the strain sensor 1 is able to detect strain based on resistance variation. In order to efficiently detect strain, it is preferable that the CNT fibers be oriented in a direction perpendicular to the direction A in which the electrodes 3 are separated from each other.

Figure 2:
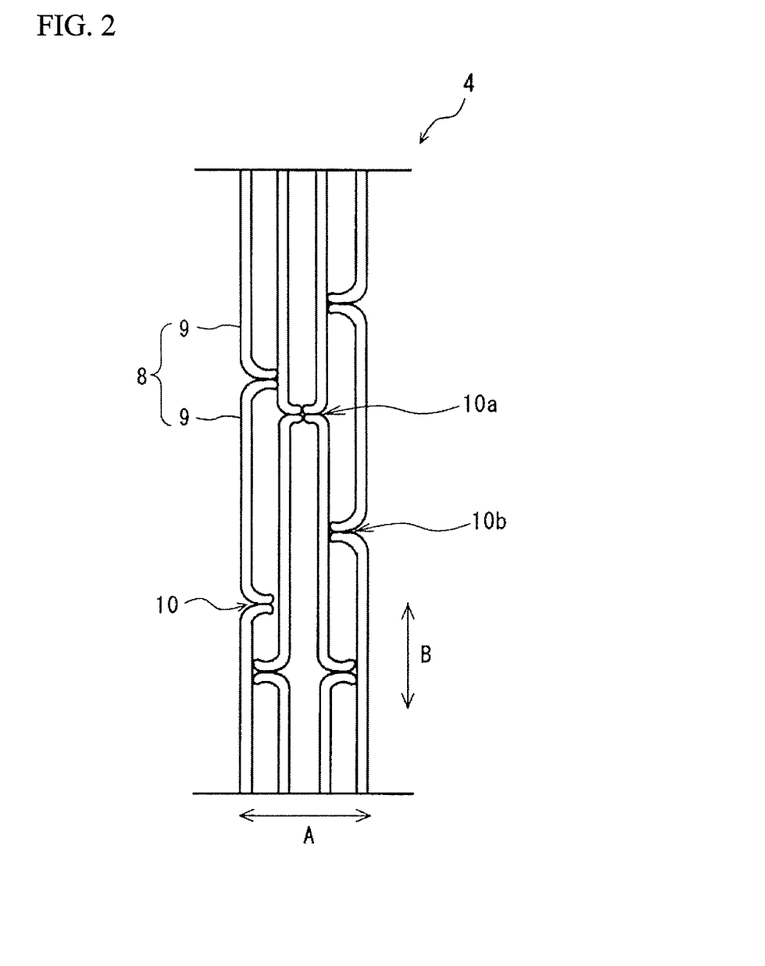
FIG. 2 is an enlarged view illustrating a part of a CNT film, made of CNT fibers, in the strain sensor.

As shown in FIG. 2, the CNT fibers 8 are made of a plurality of CNT monofilaments (or single fibers) 9. Each CNT monofilament 9 is a single CNT having a long length. The CNT fiber 8 includes a coupler 10 for connecting the distal ends of CNT monofilaments 9. The CNT monofilaments 9 are connected together in a longitudinal direction B. As described above, the CNT film 4 includes a plurality of CNT fibers 8, each of which connects a plurality of CNT monofilaments 9 in the longitudinal direction B. This allows the CNT film 4 to exhibit a wide range of orientation directions in aligning the CNT fibers 8. As a result, it is possible to reduce the resistance of the CNT film 4, thus decreasing resistance variations among them.

As shown in FIG. 2, a plurality of CNT fibers 8 has a network structure. Specifically, a plurality of CNT fibers 8 is placed in contact with each other and coupled together in a network via the couplers 10. The couplers 10 can be classified into two types, namely a multiple coupler 10a connecting the distal ends of three or more CNT monofilaments 9 and a duplex coupler 10b for connecting the distal ends of two CNT monofilaments 9 to the intermediate part of another CNT monofilament 9. Due to a network structure, a plurality of CNT fibers 8 may closely contact with each other, thus reducing the resistance of the CNT film 4.

Additionally, the CNT fibers 8 may function as a both-sided beam structure since the adjacent CNT fibers 8 are placed in contact with each other and coupled together about the couplers 10a, 10b serving as cardinal points. Herein, the mutual coupling of the CNT fibers 8 indicates that the CNT fibers 8 are electrically connected together with the couplers 10a, 10b. But, it also indicates that the CNT fibers 8 are electrically connected together with the other parts thereof, barring the couplers 10a, 10b. The mutual contact of the CNT fibers 8 indicates that the CNT fibers 8 are placed in contact with the couplers 10a, 10b but not electrically connected together with the couplers 10a, 10b. It also indicates that the CNT fibers 8 are placed in contact with the couplers 10a, 10b but not electrically connected together with the other parts thereof, barring the couplers 10a, 10b. The CNT fibers 8 functioning as a both-sided beam structure should be increased in the spring constant thereof. For this reason, the CNT fibers 8 are hardly expanded or contracted in the longitudinal direction A of the CNT film 4 perpendicular to the orientation direction B of the CNT fibers 8. This indicates that the CNT film 4 is increased in rigidity in the longitudinal direction A perpendicular to the orientation direction B of the CNT fibers 8. This may improve the linearity of sensing because the strain sensor 1 is able to sensitively detect strain occurring in the longitudinal direction A of the CNT film 4. In this connection, the adjacent CNT fibers 8 do not necessarily contact/connect with each other via the couplers 10 serving as cardinal points. In other words, each CNT fiber 8 may contact/connect with another CNT fiber 8, which is arranged over a certain number of CNT fibers 8, via the coupler 10. The CNT film 4, including a plurality of CNT fibers 8 coupled together in a complex network structure, may be reduced in resistance. Thus, the strain sensor 1 including the CNT film 4 can be increased in rigidity in the perpendicular direction to the orientation direction of the CNT fibers 8.

It is not necessary to twine the CNT fibers 8, including a plurality of CNT monofilaments 9 which are oriented substantially in the longitudinal direction B of the CNT fibers 8. Using the "untwined" CNT fibers 8, it is possible to improve the uniformity in producing the CNT film 4. Thus, it is possible to improve the linearity of sensing in the strain sensor 1.

At the coupler 10, the CNT monofilaments 9 are coupled together due to intermolecular force. For this reason, the network structure of connecting a plurality of CNT fibers 8 via the couplers 10 may suppress an increase of resistance due to the couplers 10.

The lower limit to the widths of the CNT film 4 can be preferably set to 1 mm, more preferably 1 cm. The upper limit to the width of the CNT film 4 can be preferably set to 10 cm, more preferably 5 cm. Due to the enlarged width of the CNT film 4, it is possible to reduce the resistance of the CNT film 4, thus reducing resistance variations among the CNT film 4.

The thickness of the CNT film is not necessarily limited to a specific value. However, for example, the lower limit to the average thickness of the CNT film 4 can be preferably set to 1 μm, more preferably 10 μm. The upper limit of the average thickness of the CNT film 4 can be preferably set to 5 mm, more preferably 1 mm. It is difficult to produce the CNT film 4 with the average thickness less than the lower limit. The CNT film 4 with the average thickness less than the lower limit may significantly increase the resistance thereof. In contract, the CNT film 4 with the average thickness exceeding the upper limit may reduce the sensitivity to strain.

It is possible to form the CNT film 4 with a single-layered structure arranging a plurality of CNT fibers 8 in parallel or in a two-dimensional plane. Alternatively, it is possible to form the CNT film 4 with a multi-layered structure arranging a plurality of CNT fibers 8 in multiple layers. It is preferable to adopt the multi-layered structure securing a certain degree of conductivity.

As the CNT monofilaments 9, it is possible to employ either single-walled nanotubes (SWNTs) or multi-walled nanotubes (MWNTs). It is preferable to employ MWNTs in terms of the conductivity and the thermal capacity. It is more preferable to employ MWNTs with the diameter ranging from 1.5 nm to 100 nm.

It is possible to produce the CNT monofilaments 9 according to the known method, such as the CVD (Chemical Vapor Deposition) method, the electrical arc method, the laser application method, the DIPS (Digital Image Processing System), and the CoMoCAT. Among these methods, it is preferable to adopt the CVD method using ethylene gas and iron catalyst because the CVD method is able to efficiently produce carbon nanotubes (i.e. multi-walled nanotubes, MWNTs) with desired sizes. In this case, it is possible to produce CNT crystals with desired lengths, which are grown with vertical orientation, on a thin film made of iron (serving as catalyst) or nickel which is formed on a substrate, such as a quartz glass substrate and a silicon substrate furnished with an oxide film.

The protective coat 5, i.e. a protective film, is laminated on the surface of the CNT film 4. Specifically, the protective coat 5 covers the CNT film 4, the surfaces of the second conductive layers 7, and a part of the surfaces of the electrodes 3. The other part of the surfaces of the electrodes 3 is not coated with the protective coat 5 and exposed to the exterior air. Due to the lamination of the protective coat 5, the protective coat 5 comes in contact with at least part of the CNT films 8 on their surfaces, thus protecting the CNT film 4. In particular, the strain sensor 1, including the protective coat 5 which is laminated on the surface of the CNT film 4, is able to prevent damage/breakage of the CNT film 4 which may occur due to unexpected contact with other matters, prevent foreign matters from entering into gaps between the CNT fibers 8, and prevent moisture or floating gas from being adhered to the CNT fibers 8.

The protective coat 5 is made of a resin, e.g. a synthetic resin, or a type of rubber, which is named as the material of the substrate 2. Among them, it is preferable to employ rubber which allows the protective coat 5 to demonstrate an adequate protection function against a high strain.

It is preferable that the protective coat 5 be made of water-based emulsion, i.e. emulsion utilizing water as the principal component of a disperse medium. Additionally, carbon nanotubes (CNT) exhibit high hydrophobic property. When the protective coat 5 made of water-based emulsion is formed via coating or dipping, for example, the protective coat 5 can be laminated on the surface of the CNT film 4 without being impregnated into the CNT film 4. Thus, it is possible to prevent the protective coat 5, made of a resin, from being impregnated into the CNT film 4 and thereby causing an impact on resistance variation of the CNT film 4. Additionally, it is possible to suppress a reduction of strain sensitivity in the CNT film 4 due to the existence of the protective coat 5. The water-based emulsion, undergoing a drying process, may stabilize the property of the protective coat 5.

The water-based emulsion utilizes water as the principal component of a dispersion medium, but the water-based emulsion may include other principal components of dispersion media, such as a hydrophobic dispersion medium (e.g. alcohol). Normally, a resin can be used as a dispersoid of emulsion. Preferably, rubber, more preferably a type of natural rubber, can be used as a dispersoid of emulsion. In particular, it is possible to adopt "latex", using a dispersion medium of water and a rubber dispersoid, as a preferable emulsion. Preferably, it is possible to adopt natural rubber latex which is a good material for forming a thin protective coat with a high strength.

The thickness of the protective coat 5 is not necessarily limited to a specific value. For example, it is possible to determine the thickness of the protective coat 5 ranging from 10 µm to 3 mm.

The CNT film 4 may include a cleavable part 11 elongated in the orientation direction B of the CNT fibers 8. It is possible to improve transient response to resistance variation in the CNT film 4 furnished with the cleavable part 11 elongated in the orientation direction B of the CNT fibers 8. That is, the strain sensor 1 including the CNT film 4 furnished with the cleavable part 11 is able to demonstrate a superior sensing function against a high strain (e.g. a large expansion/contraction). With a high strain applied to the strain sensor 1, a part of the protective coat 5 contacting with the cleavable part 11 may be greatly deformed, while the other part of the protective coat 5 not contacting with the cleavable part 11 may be slightly deformed.

The strain sensor 1, including the CNT film 4 with the cleavable part 11, is able to demonstrate an adequate sensing function detecting various strains because the CNT film 4 is deformed (e.g. expanded/contracted) depending on strains applied to the substrate 2 so that the resistance of the CNT film 4 will be correspondingly varied. In this connection, the substrate 2 of the strain sensor 1 may undergo various types of strains, such as a strain in the normal direction of the substrate 2 and an axial twisting about the longitudinal direction A, other than an expansion/contraction in the longitudinal direction A. The stain sensor 1 is able to detect different types of strains applied to the substrate 2. The strain sensor 1 is advantageous in that the protective coat 5 is able to prevent damage/breakage of the CNT film 4, thus improving durability in sensing functionality.

2. Manufacturing Method

The manufacturing method of the strain sensor 1 of the first embodiment is not necessarily limited to a specific method, but it is possible to produce the strain sensor 1 by way of the following steps.

(1-1) First Step

A slide glass or latex is impregnated into a resin solution and then dried. Thus, it is possible to form the substrate 2, having a rectangular shape in plan view, on both sides of a slide glass. Of course, it is possible to use other plate-like materials than a slide glass.

(1-2) Second Step

Conductive rubber adhesives are applied to the opposite ends of the substrate 2 in the longitudinal direction, thus forming a pair of first conductive layers 6. Subsequently, a pair of electrodes 3 is laminated on a pair of first conductive layers 6.

(1-3) Third Step

Figure 3:
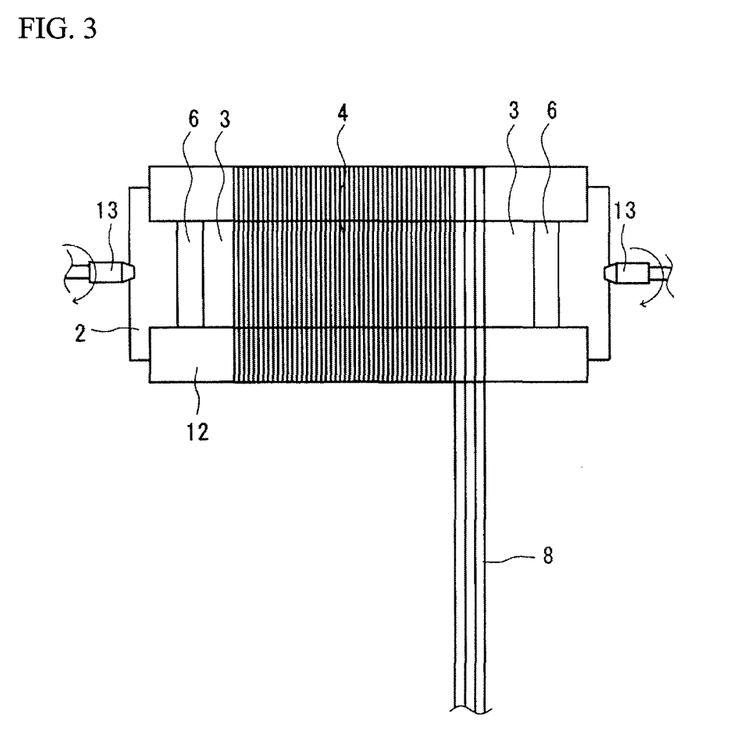
FIG. 3 is a machine drawing illustrating a method how to form a CNT film made of CNT fibers.

Next, as shown in FIG. 3, a plurality of CNT fibers 8 is wound about the slide glass (i.e. the substrate 2) in a predetermined area between the electrodes 3, thus forming the CNT film 4. This makes it possible to produce the CNT film 4 including a plurality of CNT fibers 8 oriented in one direction (i.e. a perpendicular direction to the separating direction of the electrodes 3). At this time, the opposite ends of the slide glass (i.e. the substrate 2) in the longitudinal direction are cramped using a pair of support members 3. Herein, a plurality of CNT fibers 8 is wound about the slide glass (i.e. the substrate 2) while rotating about an axis of the longitudinal direction. Additionally, the opposite ends of the slide glass in the width direction may be masked using masking tapes 12.

Figure 5:
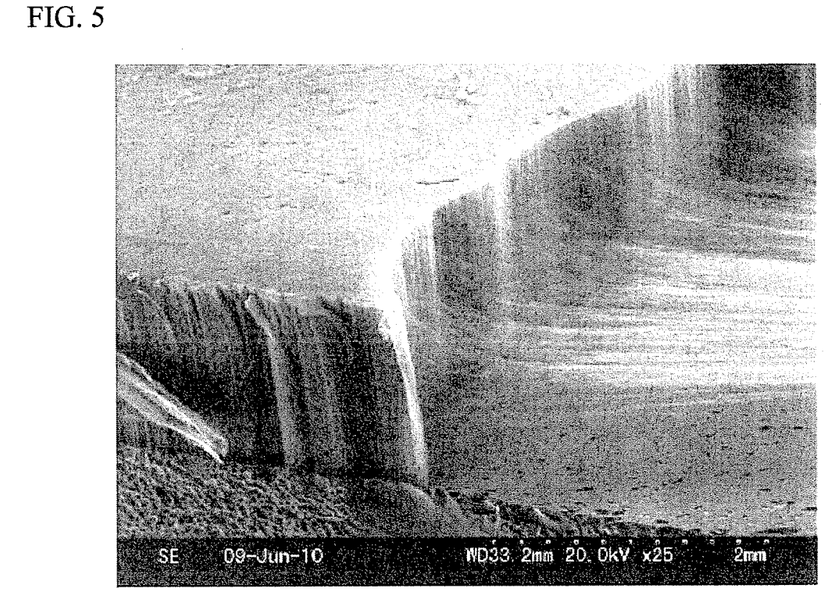
FIG. 5 is an SEM picture of CNT fibers formed in the first embodiment.

As shown in FIG. 5, it is possible to directly pull out the CNT fibers 8 without twining crystals of CNT monofilaments 9, which are grown in vertical orientation on the substrate 2 according to the CVD method. The CNT fibers 8 are each configured of a plurality of CNT monofilaments 9 which are mutually coupled together in the longitudinal direction via the couplers 10.

It is not necessary to directly wind the CNT fibers 8 about a slide glass. Alternatively, it is possible to use the CNT film 4 which is formed by winding the CNT fibers 8 about another plate-like member or another cylindrical member.

(1-4) Fourth Step

After the formation of the CNT film 4, it is preferable to spray a solvent (e.g. isopropyl alcohol or ethanol) toward the CNT film 4 or soak the CNT film 4 into a solvent. Subsequently, the CNT film 4 should be dried. This step may improve adherence between the CNT film 4 and the substrate 2 while highly densifying a plurality of CNT fibers 8 in the CNT film 4. The contact areas between the CNT fibers 8 can be increased due to high densification of the CNT fibers 8 in advance. This yields outstanding effects, such as an effect of reducing power consumption due to reduced resistance of the CNT film 4 and an effect of improving sensitivity to resistance variation under a stained condition.

(1-5) Fifth Step

Next, conductive rubber adhesives are applied to the opposite ends of the CNT film 4 in the longitudinal direction while partially exposing the electrodes 3, thus forming a pair of second conductive layers 7.

(1-6) Sixth Step

Next, the protective coat 5 is formed by impregnating the entirety of an intermediate product including the slide glass into latex or by applying latex to the surface of the CNT film 4. Using latex, it is possible to easily laminate the protective coat 5 on the surface of the CNT film 4. At this time, the protective coat 5 is formed so as not to entirely cover the intermediate product, thus partially exposing the electrodes 3. As descried above, latex is water-based emulsion with a hydrophilic property.

(1-7) Seventh Step

After the formation of the protective coat 5, a laminated body is extracted from each of the surfaces of the slide glass. This yields at least a pair of strain sensors 1. The opposite ends of the slide glass in the width direction can be truncated. Alternatively, it is possible to produce a plurality of strain sensors 1 from one surface of the slide glass by splitting it in the longitudinal direction. After extracted from the slide glass, the strain sensor 1 is stretched in the separating direction of the electrodes 3, thus forming the cleavable part 11 in the CNT film 4 and/or the protective coat 5.

3. Second Embodiment

Figure 4A:
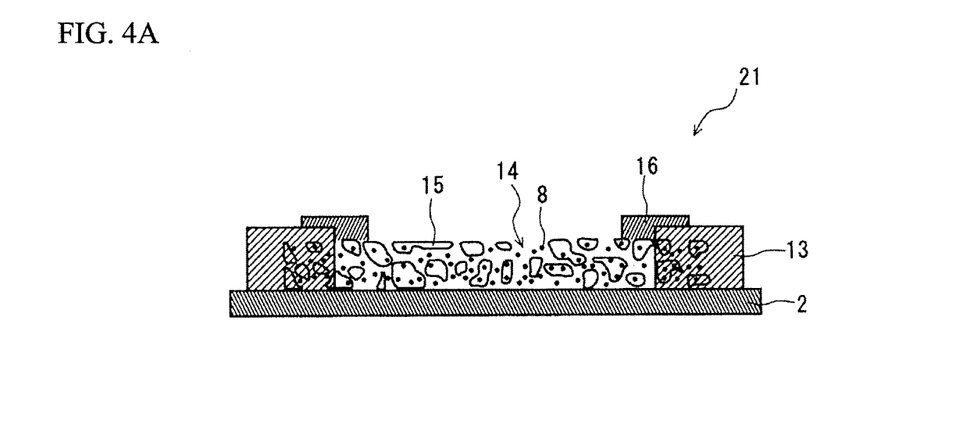
FIG. 4A is a cross-sectional view of a strain sensor according to a second embodiment of the present invention.
Figure 4B:
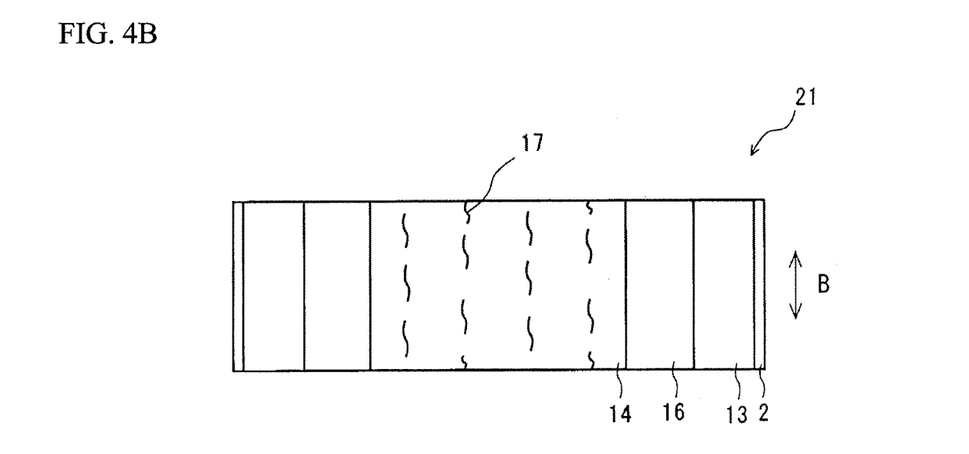
FIG. 4B is a plan view of the strain sensor.

FIGS. 4A and 4B show a strain sensor 21 according to a second embodiment of the present invention, wherein parts identical to those of the strain sensor 1 shown in FIGS. 1A and 1B are designated using the same reference signs. The strain sensor 21 includes a pair of electrodes 13, a CNT film 14, a protective coat 15, and a resin layer 16 on the substrate 2.

The CNT film 14 is directly laminated on the surface of the substrate 2. The CNT film 14 includes a plurality of CNT fibers 8 which adjoin each other with gaps therebetween. The protective coat 15 is permeated into at least part of the gaps formed between the CNT fibers 8. Even when the protective coat 15 is partially permeated into the gaps formed between the CNT fibers 8 forming the CNT film 14, it is possible to prevent damage/breakage of the CNT film 14 due to unexpected contact with other matters, to prevent foreign matters from entering into the gaps between the CNT fibers 8, and to suppress moisture or floating gas adhered to the CNT fibers 8. Due to the permeation of the protective coat 15 into the gaps between the CNT fibers 8, the CNT film 14 may be reduced in thickness when it is stretched, and therefore CNT fibers 8 approach each other in the thickness direction of the substrate 2, thus suppressing a reduction of resistance in the CNT film 14.

The CNT film 14 includes a plurality of cleavable parts 17 running in the orientation direction B of the CNT fibers 8. Due to the formation of the cleavable parts 17 running in the orientation direction B of the CNT fibers 8 in the CNT film 14, it is possible to improve transient response to resistance variation. Thus, the strain sensor 21 is able to demonstrate a superior sensing function against a large strain (or a large expansion/contraction).

Besides this structural feature regarding the CNT film 14, the strain sensor 21 is similar to the strain sensor 1 in terms of the shape, structure, and materials; hence, detailed descriptions thereof will be omitted here.

The protective coat 15 should be mainly made of a resin, preferably resin particles. It is preferable that the material of the protective coat 15 be made of particles insoluble in an organic solvent having hydrophobic property. Particles dispersed in an organic solvent having hydrophobic property may be easily permeated into the CNT film 14. A resin (i.e. particles) forming the protective coat 15 is applied to at least part of the gaps between the CNT fibers 8 forming the CNT film 14. That is, the protective coat 15 is applied to at least part of the gaps between the CNT fibers 8 in such a way that the protective coat 15 will be impregnated into the CNT film 14. Additionally, the protective coat 15 is applied to at least part of the surface of the CNT film 14 and at least part of the gaps between the CNT fibers 8 forming the surface of the CNT film 14.

Preferably, the protective coat 15 is made of oil-based emulsion with a dispersion medium using a hydrophobic organic solvent and a dispersoid using a resin (i.e. particles). That is, the protective coat 15 is formed by applying oil-based emulsion to the surface of the CNT film 14 or by dipping the CNT film 14 in oil-based emulsion. It is preferable that the solid concentration of particles in the oil-based emulsion range from 1 weight-percent to 20 weight-percent, more preferably from 5 weight-percent to 10 weight-percent. Using the oil-based emulsion including particles at a relatively low concentration, it is possible to easily locate the protective coat 15 in the gaps between the CNT fibers 8 forming the CNT film 14. Since the protective coat 15 is located in at least part of the gaps between the CNT fibers 8, it is possible to secure an adequate resistance variation occurring in the CNT film 14 against strain even though the protective coat 15 is partially permeated into the CNT film 14. This guarantees a good sensing function of the strain sensor 21.

It is noted that the solid concentration of the emulsion less than 1 weight-percent may result in an inadequate joining property due to insufficient impregnation of the emulsion into the CNT film 14. Additionally, the solid concentration of the emulsion above 20 weight-percent may result in a reduction of resistance due to excessive impregnation of the emulsion into the CNT film 14.

The hydrophobic organic solvent is not necessarily limited to a specific material. But, it is possible to use toluene as an example of a hydrophobic organic solvent. As a resin (i.e. particles) forming the protective coat 15, it is possible to name a synthetic resin or a type of rubber. However, it is preferable to use polystyrene which is an elastic resin and preferable for use in a strain sensor.

As a resin reducing resistance of the CNT film 14, it is preferable to use a resin including conductive rubber adhesive or conductive additives. This realizes conductive additives included in the protective coat 15. Thus, it is possible to suppress an increase of resistance of the CNT film 14 including at least part of the protective coat 15; hence, it is possible to maintain an adequate sensing function.

The conductive additives are not necessarily limited to specific materials. However, it is possible to name carbon additives, such as carbon black and carbon fibers, and metallic additives, such as metal powders (e.g. silver, copper, aluminum) and metallic fibers. Among them, it is preferable to use carbon additives which exhibit good affinity to carbon nanotubes (CNTs) and which can be uniformly dispersed in the CNT film 14.

Similar to the CNT film 14, the protective coat 15 may include a plurality of cleavable parts 17 running in the orientation direction B of the CNT fibers 8. The cleavable parts 17 allow the CNT film 14 and the protective coat 15 to be integrally stretched against stretching of the strain sensor 21 in the separating direction of the electrodes 13. The strain sensor 21 is able to demonstrate superior transient response to strain applied thereto since the protective coat 15 secures a shape memory effect on the CNT film 14.

A pair of electrodes 13 is formed at the opposite ends of the substrate 2 and the CNT film 14 in the longitudinal direction. In other words, a pair of electrodes 13 is positioned at the opposite ends separated in a direction different from (or perpendicular to) the orientation direction of the CNT fibers 8 forming the CNT film 14. A pair of electrodes 13 is electrically connected to the opposite ends of the CNT film 14 in the longitudinal direction.

The material of the electrodes 13 is not necessarily limited to a specific material as long as it has conductivity. However, it is preferable to use conductive adhesive. The electrodes 13 made of conductive adhesives may improve adherence between the substrate 2, the CNT film 14, and the protective coat 15. When conductive adhesives are applied to the surface of the CNT film 14, they may be partially impregnated into the CNT film 14, thus making the electrodes 13 (made of conductive adhesives) easily contact with the CNT film 14.

The resin layer 16 is formed on the surface of the connected part between the electrodes 13 and the CNT film 14. The resin layer 16 may improve adherence between the electrodes 13 and the CNT film 14, thus improving durability of the strain sensor 21. The material of the resin layer 16 is not necessarily limited to a specific material. But, it is possible to use a synthetic resin or rubber.

4. Manufacturing Method

The manufacturing method of the strain sensor 21 is not necessarily limited to a specific manufacturing method. For example, it is possible to produce the strain sensor 21 by way of the following steps.

(2-1) First Step

Similar to the first embodiment, a slide glass or latex is impregnated into a resin solution and then dried. Thus, it is possible to form the substrate 2, having a rectangular shape in plan view, on both sides of a slide glass.

(2-2) Second Step

Next, a plurality of CNT fibers 8 is wound about the slide glass in the width direction, thus forming the CNT film 14 on the substrate 2. Alternatively, it is possible to prepare the CNT film 14 in advance and to laminate it on the substrate 2. Similar to the first embodiment, after the formation of the CNT film 4, it is preferable to spray a solvent toward the CNT film 4 or dip the CNT film 4 in a solvent. This step may improve adherence between the CNT film 4 and the substrate 2 while highly densifying a plurality of CNT fibers 8 in the CNT film 14. The contact areas between the CNT fibers 8 can be increased due to high densification of the CNT fibers 8 in advance. This yields outstanding effects, such as an effect of reducing power consumption due to reduced resistance of the CNT film 14 and an effect of improving sensitivity to resistance variation under a stained condition.

(2-3) Third Step

An oil-based emulsion (e.g. toluene dispersed with resin particles) is applied to the surface of the CNT film 14, thus partially impregnating the protective coat 15 into the CNT film 14. This allows resin particles to be located in at least part of the CNT fibers 8 forming the CNT film 14. Specifically, by applying the oil-based emulsion to the surface of the CNT film 14, it possible to locate the protective coat 15 in at least part of the surface of the CNT film 14 and/or in at least part of the gaps between the CNT fibers 8 forming the surface of the CNT film 14. Additionally, it is possible to protect the surface of the CNT film 14. The protective coat 15 may partially include the CNT fibers 8. As the oil-based emulsion, it is preferable to use conductive rubber adhesives dispersed in toluene, which may reduce resistance of the CNT film 14.

(2-4) Fourth Step

After the formation of the protective coat 15, a plurality of electrodes 13 is formed by applying conductive rubber adhesives to the opposite ends of the protective coat 15 in the longitudinal direction.

(2-5) Fifth Step

Next, the resin layer 16 is formed by applying elastic adhesive or latex to the connected part between the electrodes 13 and the CNT film 14.

(2-6) Sixth Step

After the formation of the resin layer 16, at least a pair of strain sensors 21 is produced by extracting laminated bodies from both sides of the slide glass. After extracted from the slide glass, the strain sensor 21 is stretched in the separating direction of the electrodes 13 so as to form the cleavable parts 17 in the CNT film 14 and the protective coat 15.

5. Variations

The present invention is not necessarily limited to the first and second embodiments. For example, it is possible to modify the sixth step (1-6) of the first embodiment such that the water-based emulsion is replaced with the oil-based emulsion, thus creating a modification of the strain sensor 1 in which the protective coat 5 made of the oil-based emulsion is located in at least part of the gaps between the CNT fibers 8. In contrast, it is possible to modify the third step (2-3) of the second embodiment such that the oil-based emulsion is replaced with the water-based emulsion, thus creating a modification of the strain sensor 21 in which the protective coat 15 made of the water-based emulsion is laminated on the surface of the CNT film 14. Moreover, it is possible to laminate a resin film on the surface of the CNT film 14 before the protective coat 15 is laminated on the surface of the CNT film 14.

In the strain sensor of the present invention, the protective coat may contact with at least part of CNT fibers, wherein a resin forming the protective coat may be impregnated into a part of the CNT film, e.g. an area proximate to the surface of the CNT film. Additionally, it is possible to laminate the protective coat on the CNT film while the protective coat is partially permeated into a part of the gaps between CNT fibers. This strain sensor is able to protect the CNT film with the protective coat; hence, it is possible to improve durability of sensing functionality.

The substrate is not necessarily limited to a plate-like member having a rectangular parallelepiped shape; that is, it is possible to employ other shapes for the substrate. For example, it is possible to a cylindrical shape or a corrugated shape for the substrate, which may expand the usage of the strain sensor. As CNT fibers, it is possible to use CNT fibers which are produced by spinning carbon nanotubes (CNTs).

Additionally, the CNT film may be equipped with another pair of electrodes which are disposed opposite to each other in a perpendicular direction to the separating direction between a pair of electrodes. By using two pairs of electrodes which are positioned perpendicular to each other, the strain sensor may function as a two-dimensional sensor. Moreover, it is possible to coat the surface of the strain sensor with a resin having adhesiveness. This strain sensor can be easily adhered to an arbitrarily selected place for detecting strain applied to a human body, a structure, or the like.

Next, actual examples of the strain sensor according to the foregoing embodiments and variations will be described in detail. The following examples are produced according to the foregoing steps, but which are partially modified as follows.

(A) First Example (1-1) First Step

A slide glass is dipped in latex (i.e. natural rubber latex) and then dried for eight hours at the ambient temperature. Thus, it is possible to produce rubber substrates, having a rectangular shape in plan view, on both sides of the slide glass.

(1-2) Second Step

Next, conductive rubber adhesives are applied to the opposite ends of the substrate in the longitudinal direction, thus forming a pair of first conductive layers. Subsequently, a pair of electrodes is laminated on the surfaces of the first conductive layers. Herein, mesh electrodes are used as upper electrodes.

(1-3) Third Step

Next, a plurality of CNT fibers is wound about the slide glass in the width direction, thus forming a CNT film. At this time, the opposite ends of the slide glass in the width direction are masked using masking tapes.

In this connection, a plurality of CNT fibers is directly pulled out without twining crystals of CNT molecules, which are grown with vertical orientation on the substrate by way of the CVD method. This is shown in an SEM picture of FIG. 5 (where SEM stands for "Scanning Electron Microscope").

(1-4) Fourth Step

After formation of the CNT film, ethanol is sprayed onto the CNT film, which is then dried using a dryer.

(1-5) Fifth Step

Next, conductive rubber adhesives are applied to the opposite ends of the CNT film in the longitudinal direction with partially exposing the electrodes. The CNT film is dried for one hour at a temperature of 120° C., thus forming a pair of second conductive layers.

(1-6) Sixth Step

Next, latex (i.e. natural rubber latex) is applied to the surface of the CNT film with partially exposing the electrodes. Subsequently, the CNT film is dried for eight hours at the ambient temperature, thus forming a protective coat made of latex on the surface of the CNT film.

(1-7) Seventh Step

After formation of the protective coat, strain sensors according to the first embodiment shown in FIGS. 1A and 1B are extracted from both sides of the slide glass.

(B) Second Example

A strain sensor of a second example is produced according to the foregoing steps, described in the first example, except that the sixth step (1-6) is replaced with the following step (1-6').

(1-6') An oil-based emulsion (i.e. conductive rubber adhesive diluted using toluene serving as a dispersion medium at the solid concentration of 8 weight-percent) is applied to the surface of the CNT film, thus partially impregnating conductive rubber adhesive into the CNT film. This application is carried out two times separately. After application of the oil-based emulsion, the CNT film is dried for thirty minutes, thus forming a protective coat made of the oil-based emulsion on the CNT film. This guarantees that the protective coat is partially impregnated into at least part of gaps between CNT fibers forming the CNT film.

(C) Third Example (2-1) First Step

Similar to the first example, rubber substrates, having a rectangular shape in plan view, are formed on both sides of a slide glass.

(2-2) Second Step

Next, a plurality of CNT fibers is wound about the slide glass in the width direction, thus forming a CNT film. After formation of the CNT film, ethanol is sprayed onto the CNT film, which is then dried.

(2-3) Third Step

An oil-based emulsion is applied to the surface of the CNT film in such a way that resin particles, included in the oil-based emulsion, are impregnated into the CNT film, thus forming a protective coat. Herein, the oil-based emulsion is produced using conductive rubber adhesive which is diluted using toluene, serving as a dispersion medium, at the solid concentration of 8 weight-percent. The application is carried out two times separately. After application of the oil-based emulsion, the CNT film is dried thirty minutes. This guarantees that the protective coat is partially impregnated into a part of gaps between CNT fibers forming the CNT film. In this connection, the conductive rubber adhesive includes carbon black serving as conductive additives.

(2-4) Fourth Step

After formation of the protective coat, conductive rubber adhesives are applied to the opposite ends of the CNT film in the longitudinal direction, thus forming a pair of electrodes.

(2-5) Fifth Step

Next, elastic adhesive is applied to the connected part between the electrodes and the CNT film, thus forming a resin layer. After application of elastic adhesive, the CNT film is left unattended for eight hours so as to harden the elastic adhesive.

(2-6) Sixth Step

After formation of the resin layer, strain sensors according to the second embodiment (with the structure shown in FIGS. 4A and 4B) are extracted from both sides of the slide glass. Thereafter, the strain sensor is stretched in the separating direction of the electrodes, thus forming cleavable parts in the CNT film.

(D) Fourth Example

A strain sensor of a fourth example is produced according to the foregoing steps, described in the third example, except that the third to fifth steps (2-3), (2-4), and (2-5) are replaced with the following steps.

(2-3') After formation of the CNT film, conductive rubber adhesives are applied to the opposite ends of the CNT film in the longitudinal direction, thus forming a pair of electrodes. After application of conductive rubber adhesives, the CNT film is dried for one hour at the ambient temperature.

(2-4') Next, latex (i.e. natural rubber latex) is applied to the surface of the CNT film with partially exposing the electrodes. Subsequently, the CNT film is dried for eight hours at the ambient temperature, thus forming a membrane-shaped protective coat on the surface of the CNT film.

(2-5') After formation of the protective coat, strain sensors are extracted from both sides of the slide glass. Thereafter, the strain sensor is stretched in the separating direction of the electrodes, thus forming cleavable parts in the CNT film and the protective coat.

(E) Evaluation

Experiments were conducted to evaluate sensing functions with respect to strain sensors according to first to fourth examples. It is confirmed that all the strain sensors are temporarily increased in resistance occurring between a pair of electrodes when stretched, but the resistance thereof is restored to the original resistance when stretching is released.

Figure 6:
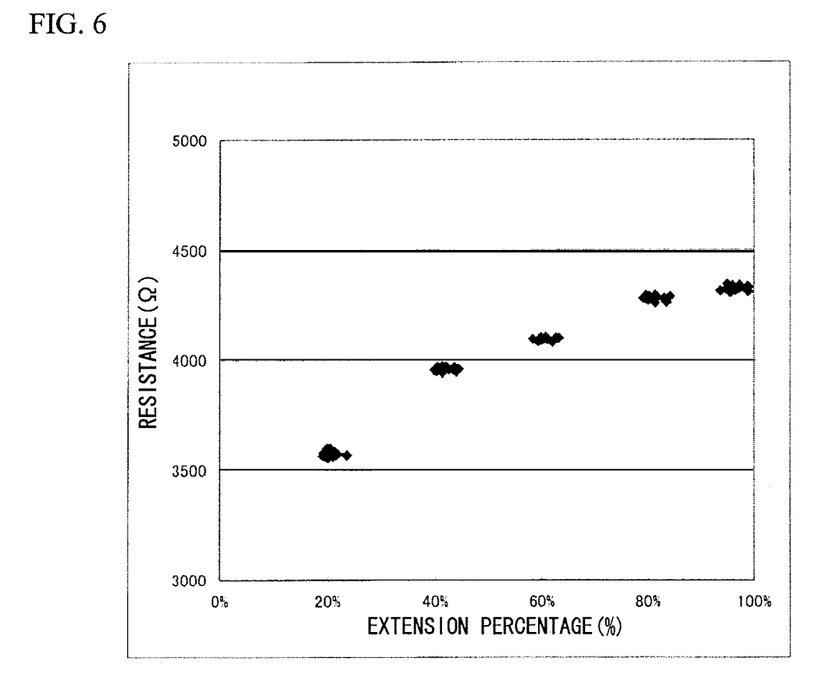
FIG. 6 is a graph showing the relationship between resistance and extension percentage with respect to the strain sensor of the second embodiment.

Samples of strain sensors according to the second example were prepared and subjected to testing, wherein resistance variation is measured on each strain sensor which is stretched in the separating direction of the electrodes by predetermined extension percentages ranging from 20% to 100%. Resistance was measured using a digital multi-meter. Measured results are shown in a graph of FIG. 6. FIG. 6 shows that high linearity is found in the relationship between the resistance and the extension percentage.

As described above, the strain sensor of the present invention demonstrates superior durability due to the protective coat protecting the CNT film and an adequate sensing function. Thus, the present invention is applicable to a wide range of devices such as pressure sensors, load cells, torque sensors, and position sensors.

Lastly, the present invention is not necessarily limited to the foregoing embodiments, variations, and examples, which can be further modified in various ways within the scope of the invention as defined in the appended claims.

What is claimed is:

1. A strain sensor comprising:
    a substrate which is flexible along a first axis;
    a CNT film which is made of a plurality of CNT fibers aligned in an orientation direction which is transverse to the first axis and which are formed on a surface of the substrate, the CNT film, and with it the contact between the CNT fibers, being expanded or compressed along the first axis as the substrate is expanded or compressed along the first axis;
    a pair of electrodes which are formed at opposite ends of the CNT film along the first axis; and
    a protective coat, made of a water based emulsion containing resin, protecting the CNT film, wherein the protective coat is placed in contact with at least part of the CNT fibers on the surface of the CNT film but is not impregnated in the CNT film, and
    wherein the plurality of CNT fibers includes a first group of CNT fibers and a second group of CNT fibers, and the second group of CNT fibers is arranged over the first group of CNT fibers, such that the plurality of CNT fibers forms a two-sided beam structure, the first group of CNT fibers being located at one side of the beam structure, the second group of CNT fibers being located at another side of the beam structure, and the sides of the beam structure being opposed to each other in a direction that is perpendicular to the first axis.

2. The strain sensor according to claim 1, wherein the protective coat is laminated on the surface of the CNT film.

3. The strain sensor according to claim 1, wherein the protective coat includes a plurality of conductive additives.

4. The strain sensor according to claim 1, wherein the CNT film includes at least one cleavable part which is cleavable in the orientation direction of the CNT fibers.

5. The strain sensor according to claim 1, wherein each of the CNT fibers is made of a plurality of CNT monofilaments which are elongated in a longitudinal direction and which are partially connected together via at least one coupler.

6. The strain sensor according to claim 5, wherein the plurality of monofilaments is mutually connected together in a network structure.

7. The strain sensor according to claim 1, wherein the protective coat is formed by applying hydrophilic latex to the surface of the CNT film.

8. The strain sensor according to claim 1, wherein the protective coat includes a plurality of resin particles insoluble in a hydrophobic organic solvent.

9. The strain sensor according to claim 1, wherein the protective coat is made of oil-based emulsion including a hydrophobic organic solvent as a dispersion medium and a plurality of resin particles as dispersoids.

10. The strain sensor according to claim 9, wherein the oil-based emulsion has solid concentration of particles ranging from 5 weight-percent to 10 weight-percent.

11. The strain sensor according to claim 1 wherein the axis is perpendicular to the orientation direction of the CNT fibers.

12. The strain sensor according to claim 1, wherein the protective coat with a thickness ranging from 10 μm to 3 mm is formed on the CNT file with a thickness ranging from 10 μm to 1 mm.

* * * * *